(12) United States Patent
Klukowski et al.

(10) Patent No.: US 8,544,886 B2
(45) Date of Patent: Oct. 1, 2013

(54) ELECTRICAL POWER-ASSISTED STEERING

(75) Inventors: Christoph Klukowski, Gamprin (LI); Johannes Schönlechner, Gaschurn (AT); Rolf Ackermann, Mels (CH)

(73) Assignee: ThyssenKrupp Presta AG, Eschen (LI)

( * ) Notice: Subject to any disclaimer, the term of this patent is extended or adjusted under 35 U.S.C. 154(b) by 0 days.

(21) Appl. No.: 13/699,098

(22) PCT Filed: Jun. 17, 2011

(86) PCT No.: PCT/EP2011/003008
§ 371 (c)(1), (2), (4) Date: Nov. 20, 2012

(87) PCT Pub. No.: WO2011/157440
PCT Pub. Date: Dec. 22, 2011

(65) Prior Publication Data
US 2013/0068553 A1 Mar. 21, 2013

(30) Foreign Application Priority Data
Jun. 18, 2010 (DE) .................... 10 2010 024 353

(51) Int. Cl.
*B62D 1/18* (2006.01)
(52) U.S. Cl.
USPC ........... 280/775; 280/777; 280/779; 180/444; 180/443; 74/493
(58) Field of Classification Search
USPC ................. 280/775, 777, 779; 180/444, 443; 74/493
See application file for complete search history.

(56) References Cited

U.S. PATENT DOCUMENTS

| 5,503,431 A * | 4/1996 | Yamamoto ................ 280/777 |
| 7,367,589 B2 * | 5/2008 | Stuedemann et al. ........ 280/777 |
| 7,607,694 B2 * | 10/2009 | Shinohara et al. ............ 280/775 |

FOREIGN PATENT DOCUMENTS

| DE | 202008015444 U1 | 2/2009 |
| EP | 1693280 A1 | 8/2006 |
| WO | WO-2005005231 A1 | 1/2005 |

OTHER PUBLICATIONS

International Preliminary Report on Patentability issued in PCT/EP2011/003008, dated Dec. 19, 2012.
International Search Report and Written Opinion issued in PCT/EP2011/003008, mailed Sep. 27, 2011 with English translation of International Search Report.

* cited by examiner

*Primary Examiner* — Tashiana Adams
*Assistant Examiner* — Marlon Arce
(74) *Attorney, Agent, or Firm* — Novak Druce Connolly Bove + Quigg LLP

(57) ABSTRACT

The invention relates to a steering system for a motor vehicle with electrical power assistance comprising: a steering-spindle bearing unit, in which the steering shaft is mounted rotatably and is guided in a slide, which can be connected to the vehicle body, wherein the steering-spindle bearing unit is adjustable at least in its inclination, an electric motor, which is coupled rotatably via reduction gearing to a steering spindle, wherein the reduction gearing is enclosed and mounted in a housing, wherein the housing has means for forming a swivelling axis, about which the steering-spindle bearing unit is adjustable in its inclination, wherein the steering system further comprises a retaining clamp for fastening the steering system to the motor vehicle, wherein the retaining clamp has a guideway that interacts with a counterstay arranged on the slide, wherein the slide is movable along the guideway after it overcomes a presettable releasing force, and in the case of displacement of the slide along the guideway, the swivelling axis is moved upwards relative to the retaining clamp.

10 Claims, 5 Drawing Sheets

ELECTRICAL POWER-ASSISTED STEERING

CROSS-REFERENCE TO RELATED APPLICATIONS

Figure 1:
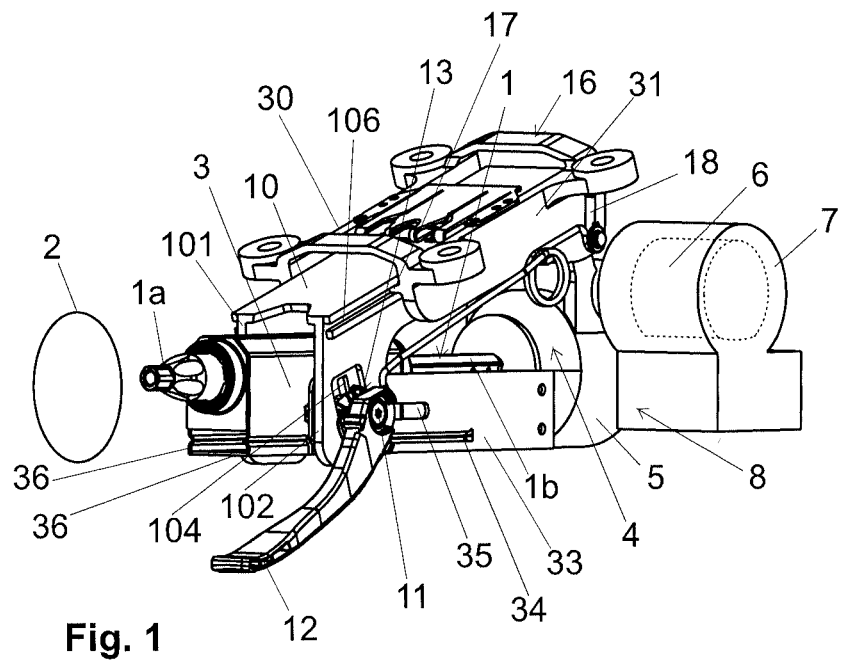

This Application is a National Stage of PCT International Application No. PCT/EP2011/003008, filed on Jun. 17, 2011, and claims priority of German Patent Application No. 10 2010 024353.1, filed on Jun. 18, 2010. The disclosures of the aforementioned applications are incorporated herein in their entirety by reference.

The present invention relates to a steering system for a motor vehicle with electrical power assistance comprising: a steering-spindle bearing unit, in which the steering shaft is mounted rotatably and which is guided in a slide, which can be connected to the vehicle body, wherein the steering-spindle bearing unit is adjustable at least in its inclination relative to the slide, an electric motor, which is coupled rotatably via reduction gearing to a steering spindle, wherein the reduction gearing is enclosed and mounted in a housing, wherein the housing has means for forming a swivelling axis, about which the steering-spindle bearing unit is adjustable in its inclination and wherein the steering system further comprises a retaining clamp, for fastening the steering system to the motor vehicle, wherein the retaining clamp has a guideway that interacts with a counterstay arranged on the slide, wherein the slide, after overcoming a presettable releasing force, is movable along the guideway.

In EP2050654A1, a steering system is disclosed, which has two column parts inserted into one another for mounting the steering spindle, which in the event of a crash are pushed together, absorbing energy. Correspondingly, in a crash, the steering spindle is displaced in its longitudinal direction towards the front of the vehicle. This solution has the disadvantage that the direction of displacement of the steering-spindle bearing unit cannot be adjusted according to the requirements. In particular, this direction depends on the particular setting of the inclination of the steering-spindle bearing unit before the start of the crash.

Document WO 2005/005231 A1 describes a steering column of this kind, in which the slide is movable along the guideway in the event of a crash. No precautions are taken to reduce the risk of collision of the driver with the reduction gearing.

OBJECT OF THE INVENTION

The object to be achieved by the invention is to provide a steering system in which the displacement of the steering spindle in a crash takes place in a direction of displacement that can be specified and the risk of a collision of the driver with the reduction gearing is reduced.

The Approach Adopted

The aforementioned object is achieved by a steering system with the features of patent claim 1. Advantageous developments of the invention are described in the subclaims.

The steering system comprises a retaining clamp for fastening the steering system to the motor vehicle, wherein the retaining clamp has a guideway that interacts with a counterstay arranged on the slide, wherein the slide is movable along the guideway after it overcomes a presettable releasing force.

In the steering system, the steering-spindle bearing unit, in the state when built into the motor vehicle, is adjustable at least in its inclination relative to the bodywork of the motor vehicle, and in a crash, after a presettable force is exceeded, it is movable in a desired direction relative to the motor vehicle.

The steering system is designed according to the invention so that in the case of displacement of the slide along the guideway, the swivelling axis is moved upwards relative to the retaining clamp, with respect to the installed position in the motor vehicle. In this way the risk of injury of the driver through contact with the housing of the reduction gearing can be reduced. In particular, in a crash the swivelling axis is also advantageously moved in a direction away from the bulkhead arranged between the passenger compartment and the engine compartment.

In the simplest case, the means for forming the swivelling axis is formed by a hole in the housing through which a swivel pin passes and is supported on the vehicle-mounted fastening.

Advantageously, in the installed position in the motor vehicle the guideway is oriented roughly in the horizontal direction, so that the displacement takes place roughly in the horizontal direction.

Advantageously, this movement of the swivelling axis in a crash is provided by a simple guiding of the swivelling axis. For this, at least one first oblong hole is arranged in the slide and at least one second oblong hole is arranged in the retaining clamp, wherein a swivel pin, which is held by the means for forming the swivelling axis, passes through these two oblong holes and these oblong holes are oriented relative to one another at an angle of more than 20°, preferably more than 60°. Through the movement of the slide relative to the retaining clamp, the swivel pin is displaced within the scissors-like overlapping oblong holes and in this way the position of the swivelling axis is displaced. The path travelled by the swivel pin and therefore by the swivelling axis in the event of a crash can be established by the orientation of the oblong holes. As the swivelling axis is connected to the housing by the means for forming the swivelling axis, the housing and correspondingly the reduction gearing are also displaced together with the swivelling axis. Advantageously, the electric motor is mounted on the housing, or more preferably is integrated into the housing. Owing to this connection, the whole power assistance device (=servo unit) is displaced with the swivelling axis.

In a preferred embodiment, the retaining clamp comprises a bottom zone, in which two lateral cheeks are arranged, which are oriented perpendicularly to the bottom zone. The side legs of the slide are received between the two lateral cheeks. Advantageously, in this embodiment, oblong holes are formed in the two lateral cheeks of the retaining clamp and in the two side legs of the slide, and a single swivel pin passes through the aforementioned oblong holes. The swivel pin is held rotatably in one or even two holes in the housing. The pin can be mounted in a sliding bearing or can also be fixed. It would also be conceivable and possible to provide just one lateral cheek and one side leg, and these can also be oriented centrally to the steering system.

In a preferred embodiment, the steering-spindle bearing unit is also adjustable in the longitudinal direction of the steering spindle relative to the slide.

Advantageously, the steering system comprises a locating device, which is adjustable between an open position and a closed position, wherein in the open position the steering-spindle bearing unit is movable relative to the slide and in the closed position it is held by frictional resistance or by positive engagement so that it cannot move relative to the slide.

It is further preferable to provide, on both sides of the steering-spindle bearing unit, retaining cheeks that are fastened to the housing and are in contact with side surfaces of the steering-spindle bearing unit, wherein the retaining cheeks have oblong holes, through which a clamping bolt passes, and are connected to the slide and the steering-spindle bearing unit with frictional resistance. This increases the rigidity of the arrangement. In particular, the reduction gearing and the electric motor are supported on these retaining cheeks.

Advantageously, the steering system is provided with means for absorbing energy, which absorb energy in the case of displacement of the slide relative to the retaining clamp.

These means can be formed by a bending strip and/or a bending breaking strap. The strip or the strap consists of a curved plate, which has a curved portion and two straight portions contiguous therewith, which can also be called ends. One end of the strip or strap is fastened to the retaining clamp. The other, preferably U-shaped, bent-back end of the strip or strap is fastened to the slide. In a crash, the two ends are displaced relative to one another, wherein the strip deforms with displacement of the curved portion. Moreover, a portion of the strip can also be torn out of a base plate.

Figure 2:
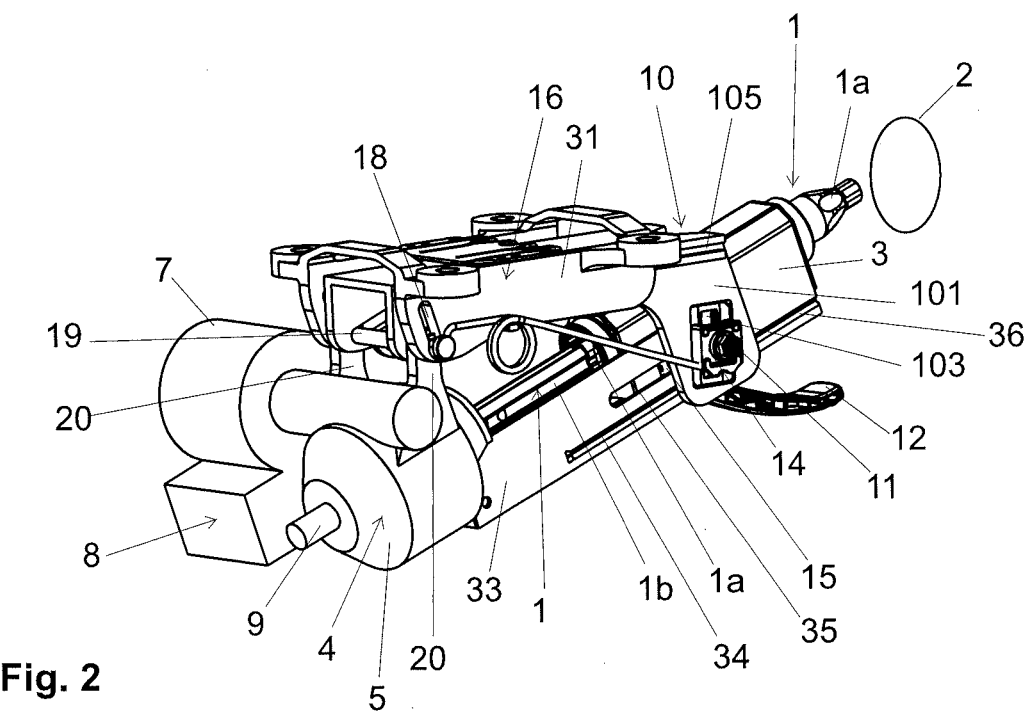
Figure 3:
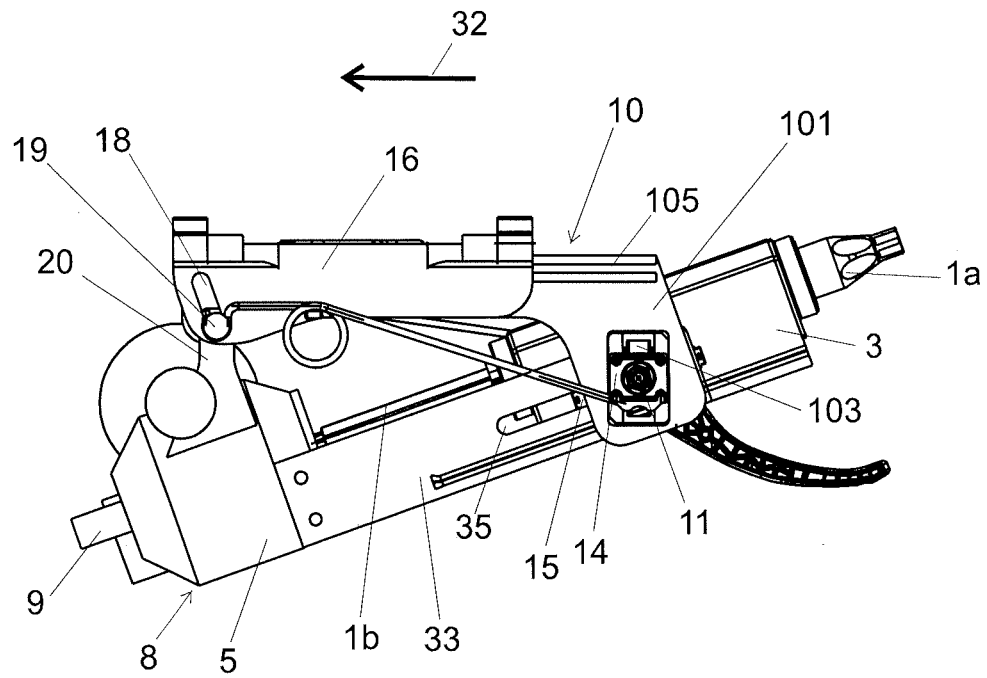
Figure 4:
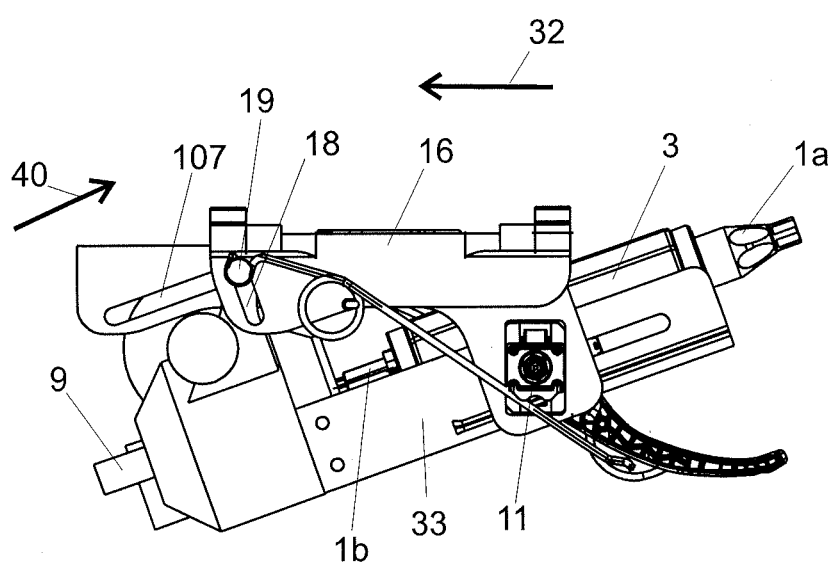
Figure 5:
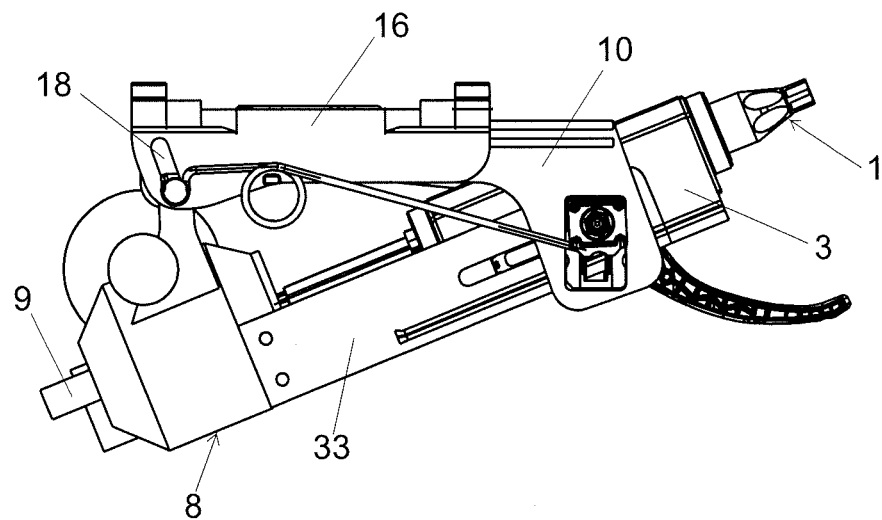
Figure 6:
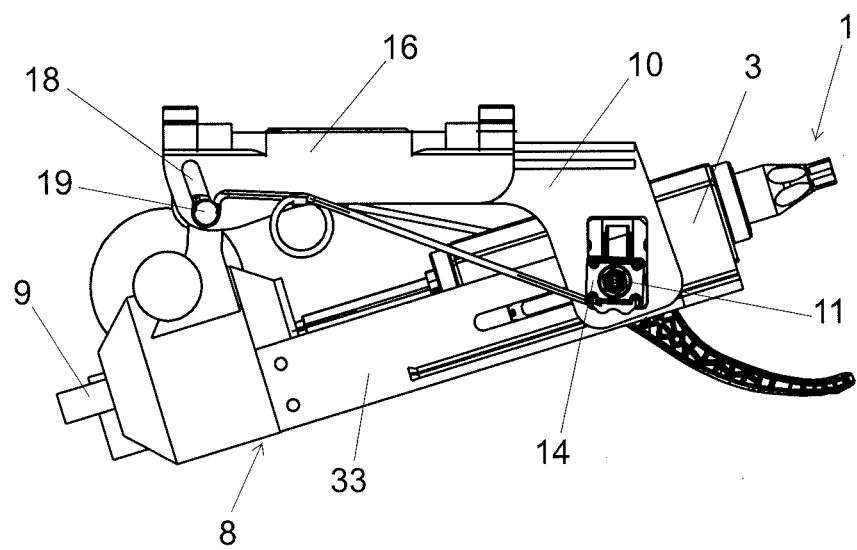
Figure 7:
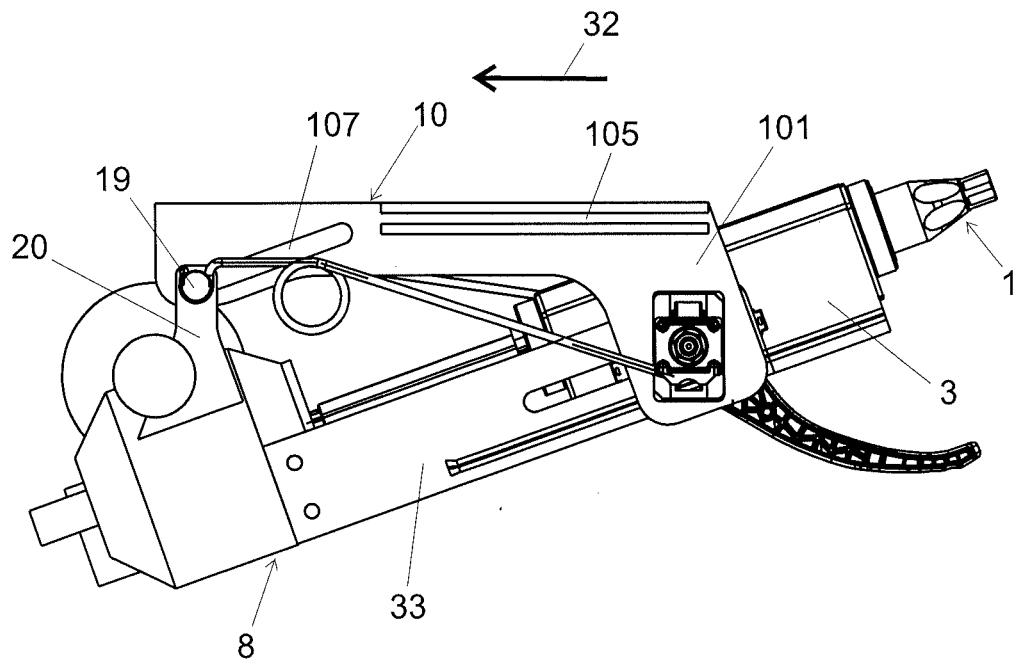
Figure 8:
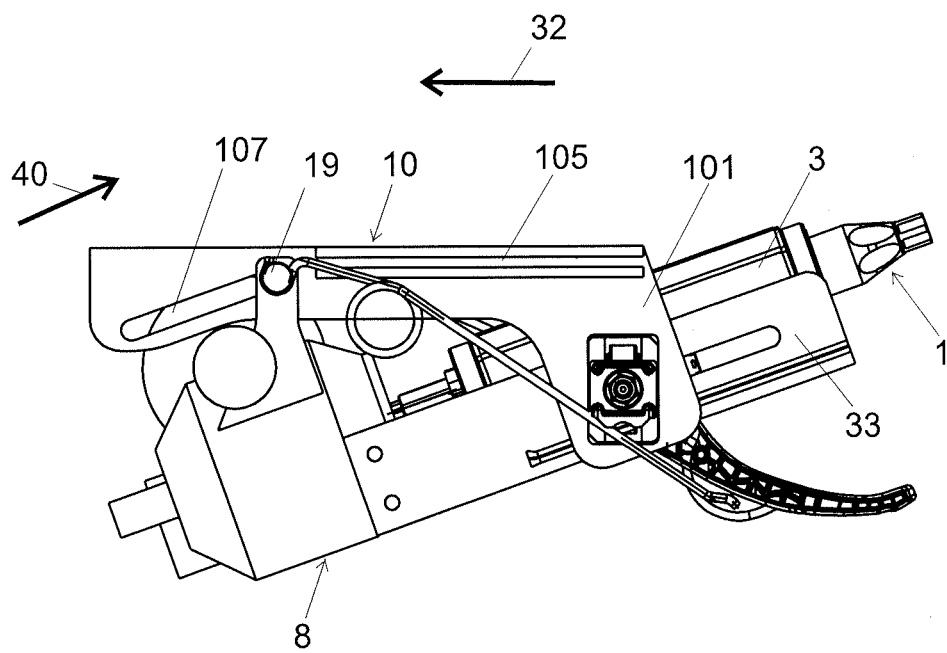
Figure 9:
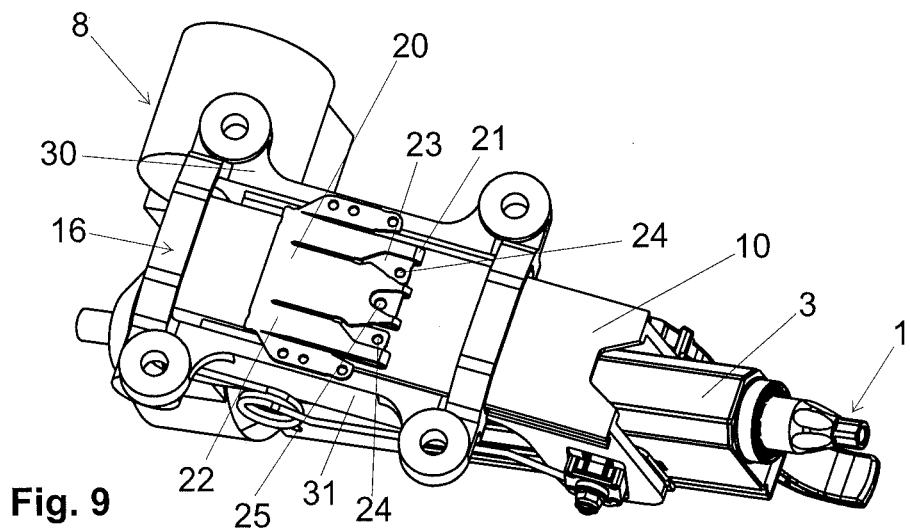
Figure 10:
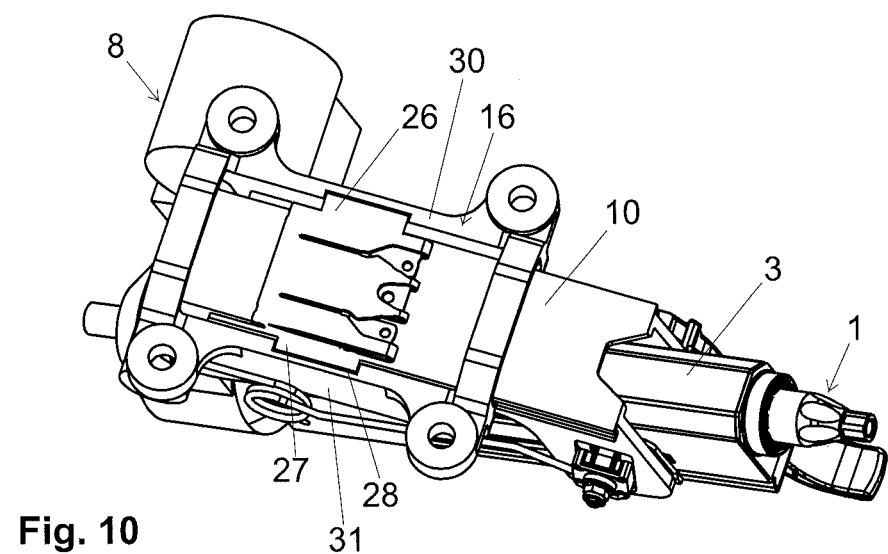
Figure 11:
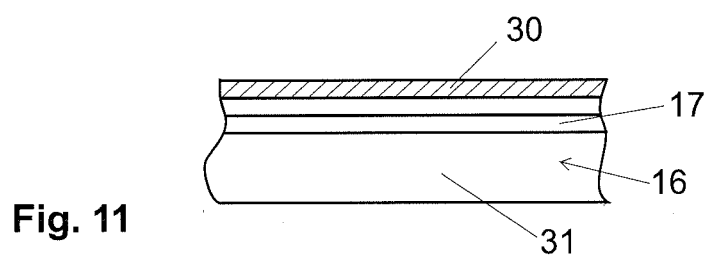

Exemplary embodiments of the invention are explained with the aid of the drawings, showing:

FIG. 1 an exemplary embodiment of the invention in a view seen from the rear of the motor vehicle;

FIG. 2 the steering system corresponding to FIG. 1 in a view seen from the front of the motor vehicle;

FIG. 3 the steering system corresponding to FIG. 1 in a side view of the exemplary embodiment in a situation before the crash with a set lengthwise position of the steering spindle;

FIG. 4 the steering system corresponding to FIG. 1 in a side view of the exemplary embodiment in a situation after the crash;

FIG. 5 the steering system corresponding to FIG. 1 in a side view of the exemplary embodiment in a situation with a set lengthwise position and in the highest setting position of the steering spindle;

FIG. 6 the steering system corresponding to FIG. 1 in a side view of the exemplary embodiment in a situation with a set lengthwise position and in the lowest setting position of the steering spindle;

FIG. 7 the steering system corresponding to FIG. 1 in a side view of the exemplary embodiment in a situation before the crash with a set lengthwise position of the steering spindle, wherein the retaining clamp is not shown;

FIG. 8 the steering system corresponding to FIG. 1 in a side view of the practical example in a situation after the crash, wherein the retaining clamp is not shown;

FIG. 9 the steering system corresponding to FIG. 1 in a view on the bending breaking strap;

FIG. 10 the steering system similar to FIG. 1 in a view on the bending breaking strap, which is fastened in an alternative embodiment;

FIG. 11 section from the retaining clamp with a view of a section of the guideway.

FIGS. 1-9 show the first exemplary embodiment of the invention. The steering system comprises a steering spindle 1, on which the steering wheel 2 can be fastened. The steering spindle 1 comprises an upper part of the steering spindle 1a and a lower part of the steering spindle 1b, which are movable relative to one another. The steering wheel 2 can be fastened to the upper part of the steering spindle 1a. The steering spindle is mounted rotatably in a steering-spindle bearing unit 3 and is led into reduction gearing 4 (not shown precisely), which is housed in a housing 5. An electric motor 6, shown with dashed lines, is arranged in another housing 7. The electric motor is controlled by control signals and supplies a corresponding assisting force, for assisting the steering movement of the driver on operating the steering wheel 2. For this, the output shaft of the electric motor is coupled via the reduction gearing 4 to the steering spindle 1. The electric motor 6 and the reduction gearing 4 are only illustrated highly schematically in the drawings. Gearing of this kind is known in the prior art, and therefore need not be discussed in more detail here. The reduction gearing 4 and the electric motor 6, which are accommodated in housings 5 and 7, together form the servo unit 8. Further components of the steering system are connected to the output shaft 9 of the servo unit 8 with frictional connection, in particular a steering pinion, by which a rack is actuated, which brings about the swivelling of the wheels (not shown in the drawings). The steering-spindle bearing unit 3 is held in a slide 10 with side legs 101, 102. The slide has oblong holes 103, 104 in its side legs 101 and 102 respectively. A clamping bolt 11, which can be turned by a tensioning lever 12, passes through these side legs. By means of a cam/cam-follower pair, as is known in the prior art, on rotation of the clamping bolt 11, the cam is rotated relative to the cam follower, so that the clamping bolt 11 is displaced axially. In the closed position, the pressure plate 14 is pressed against the cam/cam-follower pair, so that the two side legs 101, 102 are pressed against the side surfaces of the steering-spindle bearing unit 3. In the open position of the locating device, which is not shown in the drawings, the cam and cam follower 13 are rotated relative to one another, so that the pressure plate 14 is no longer pressed against the side legs 101 and therefore the steering-spindle bearing unit is movable relative to the slide 10 along the oblong holes 103, 104 in the side legs 101 or 102 respectively.

In the exemplary embodiment shown, in the steering-spindle bearing unit 3, oblong holes 15 are formed, through which the clamping bolt 11 passes, and in this way it becomes possible for the steering-spindle bearing unit 3 to be displaced in the longitudinal direction of the steering spindle 1. The steering system according to the invention can be designed without this lengthwise adjustment. A solution without the oblong recesses 15 in the steering-spindle bearing unit 3 is conceivable and possible. A split clamping bolt could also be used, which does not pass through the steering-spindle bearing unit.

To provide lengthwise movability (=movability of the steering spindle in its longitudinal direction), the steering spindle 1 is divided, wherein the upper part of the steering spindle 1a is mounted in the steering-spindle bearing unit and the lower part of the steering spindle 1b is connected to the upper part of the steering spindle non-rotatably, but is movable in the axial direction. The lower part of the steering spindle 1b is connected non-rotatably to the reduction gearing. This configuration of the steering spindle 1 is also advantageous in the event of a crash.

A retaining clamp 16 is provided for fastening the steering system to the motor vehicle. The retaining clamp 16 comprises a bottom zone 30 and lateral cheeks 31 arranged on either side, roughly perpendicular thereto. In the lateral cheeks 31, in each case a guideway 17 is arranged, which is formed by a web and runs in the horizontal direction in the installed position in the motor vehicle (cf. FIG. 11). This guideway runs in the direction of displacement 32, which can be established when designing the steering system. The guideways 17 are in engagement with counterstays 105, 106, which are formed in the side legs 101 or 102 respectively. Moreover, in the side legs 101, 102 of the slide, oblong holes 107 are arranged, which extend roughly parallel in the direction of the longitudinal axis of the steering spindle 1. It is to be noted that the longitudinal direction of the steering spindle changes with adjustment of the inclination of the steering spindle, so that in the most favourable case the two directions can only coincide in a single adjustment position. It is also not absolutely necessary for carrying out the invention that these two directions must coincide for any of the possible adjustment positions of the steering spindle.

The retaining clamp 16 has, in its lateral cheeks 31, oblong holes 18, which cross in scissors fashion with the oblong holes 107 in the side legs 101, 102 of the slide 10. The swivel pin 19, which is secured in holes in fixing straps 20 on the housing 5 of the reduction gearing 4, passes through the oblong holes 107 and 18.

In the exemplary embodiment, the guideways 17 of the retaining clamp 16 are clamped with frictional resistance to the counterstays 105, 106. If, in a crash, the driver is pushed onto the steering wheel 2, he transmits his energy onto the steering spindle 1 and through the fixing in the locating system onto the slide 10. After a predetermined force is exceeded, the frictional resistance of the guideways 17 in the counterstays 105, 106 is overcome and the slide 10 is moved along the guideway 17 in the retaining clamp 16 in the direction of displacement 32 towards the front of the vehicle. During this, the upper steering spindle 1a is displaced above the lower steering spindle 1b and the oblong hole 107 is displaced in the direction towards the front of the vehicle. This is illustrated particularly well by comparing FIGS. 7 and 8, as FIG. 7 shows a situation before the crash and FIG. 8 shows a situation after the crash. As the swivel pin 19 passes through the oblong holes 18 of the retaining clamp and the oblong holes 107 of the slide, during this forward movement the swivel pin 19 is displaced upwards in the exemplary embodiment shown. Correspondingly, the servo unit 8 is displaced upwards in direction 40. This ensures that the vehicle driver's legs remain free in a crash.

For absorbing energy, in addition to the frictional resistance between the guideway and the counterstay, a bending breaking strap 20 (FIGS. 9 and 10) can be provided. The bending breaking strap has one (or as shown in the example, a plurality of) curved portions 21 and end portions 22 and 23 contiguous therewith. One end portion 22 is fastened to the retaining clamp 16 by riveted connection or screw connection. The second end portion 23 is connected by screw connections or riveted connections 24 to the slide 10. In a preferred embodiment, a fastening point 25 is provided, which can be switched on or off by a pyrotechnic switch under load-dependent control, and makes a connection between the end portion 23 of the strap and the slide 10.

FIG. 10 shows an alternative embodiment, which is substantially similar to FIG. 9, except that the bending breaking strap 26 is connected positively by flange 27 in a groove 28 in the retaining clamp 16 and is therefore connected positively to the retaining clamp. This means that fewer screw connections are required. The groove 28 can be incorporated easily, during the casting operation, in the casting that forms the retaining clamp 16. If the flange 27 is formed correspondingly with sharp edges, with a corresponding cutting-in operation it is possible to ensure positive engagement without play, without requiring expensive chip-removing machining for the casting.

To increase the rigidity of the steering system, retaining cheeks 33 can be provided, which are received by the side legs 101, 102 of the slide 10 and are fastened on the housing 5. These retaining cheeks 33, running parallel to the axis of the steering spindle 1, are preferably of substantially flat design. The steering-spindle bearing unit 3 is received and guided between the two retaining cheeks 33. In the example, additional guideways 34 are formed in the retaining cheeks 33. These guideways 34 in the retaining cheeks engage in guideways 36 on the steering-spindle bearing unit, to ensure good guidance of the steering-spindle bearing unit during longitudinal adjustment of the steering spindle 1 relative to the retaining clamp 16. To provide adjustability in the longitudinal direction, corresponding oblong holes 35, through which the clamping bolt 11 passes, are provided in the retaining cheeks 33. Additional strengthening of the whole assembly is achieved in this way.

In the case when the steering system has retaining cheeks 33, these retaining cheeks are preferably pressed against the side surfaces of the steering-spindle bearing unit 3 by the locating system in the closed position together with the side legs 101, 102 of the slide 10. The retaining cheeks 33 are arranged correspondingly with frictional connection between the side legs 101, 102 and the steering-spindle bearing unit 3.

If applicable or feasible, all the various individual features of the various examples can be interchanged and/or combined, while remaining within the scope of the invention.

What is claimed is:

1. A steering system for a motor vehicle with electrical power assistance, the steering system comprising:
    a steering shaft,
    a steering-spindle bearing unit, in which the steering shaft is mounted rotatably, and which is guided in a slide, the steering-spindle bearing unit configured to be connected to a vehicle body, wherein the steering-spindle bearing unit is adjustable at least in its inclination relative to the slide,
    an electric motor, which is coupled rotatably via reduction gearing to a steering spindle, wherein the reduction gearing is enclosed and mounted in a housing, wherein the housing includes a means for forming a swivelling axis, about which the steering-spindle bearing unit is adjustable in its inclination, and
    a retaining clamp configured to fasten the steering system on the motor vehicle, wherein the retaining clamp has at least one guideway configured to interact with at least one counterstay arranged on the slide,
    wherein the slide is movable along the guideway after overcoming a presettable releasing force, and wherein, in the case of displacement of the slide along the guideway, the swivelling axis is moved upwards relative to the retaining clamp, and
    wherein at least one first oblong hole is arranged in the slide and at least one second oblong hole is arranged in the retaining clamp, wherein a swivel pin, which is held by the means for forming the swivelling axis, passes through the at least one first oblong hole and the at least one second oblong hole, and wherein the first and second oblong, holes are oriented relative to one another at an angle of more than 20°.

2. The steering system according to claim 1, wherein the steering-spindle bearing unit is adjustable in a longitudinal direction of the steering spindle relative to the slide.

3. The steering system according to claim 1, wherein the steering system farther comprises a locating device, which is adjustable between an open position and a closed position, wherein in the open position the steering-spindle bearing unit is movable relative to the slide and in the closed position the steering-spindle bearing unit is held by frictional resistance or by positive engagement so that it cannot move relative to the slide.

4. The steering system according to claim 1, further comprising retaining cheeks arranged on either side of the steering-spindle bearing unit, which are fastened to the housing and are in contact with side surfaces of the steering-spindle bearing unit, wherein the retaining cheeks have oblong holes, through which a clamping bolt passes, and are connected with frictional resistance to the slide and the steering-spindle bearing unit.

5. The steering system according to claim 1, wherein the first and second oblong holes are oriented relative to one another at an angle of more than 60°.

6. A steering system for a motor vehicle with electrical power assistance, the steering system comprising:
a steering shaft,
a steering-spindle bearing unit, in which the steering shaft is mounted rotatably, and which is guided in a slide, the steering-spindle bearing unit configured to be connected to a vehicle body, wherein the steering-spindle bearing is adjustable at least in its inclination relative to the slide
an electric motor, which is coupled rotatably via reduction gearing to a steering spindle, wherein the reduction gearing is enclosed and mounted in a housing, wherein the housing includes a means for forming a swiveling axis, about which the steering-spindle bearing unit is adjustable in its inclination,
a retaining clamp configured to fasten the steering system on the motor vehicle, wherein the retaining clamp has at least one guideway configured to interact with at least one counterstay arranged on the slide, and
means for absorbing energy configured to absorb energy in the case of displacement of the slide relative to the retaining clamp,
wherein the slide is movable along the guideway after overcoming a presettable releasing force, and wherein, in the case of displacement of the slide along the guideway, the swivelling axis is moved upwards relative to the retaining clamp.

7. The steering system according to claim 6, wherein the means for absorbing energy are formed by a bending strip and/or a bending breaking strap, wherein one end of the strip or strap is fastened to the retaining clamp and another U-shaped bent-back end of the strip or strap is fastened to the slide.

8. The steering stem according to claim 6, wherein the steering-spindle bearing unit is adjustable in a longitudinal direction of the steering spindle relative to the slide.

9. The steering system according to claim 6, wherein the steering system further comprises a locating device, which is adjustable between an open position and a closed position, wherein in the open position the steering-spindle bearing unit is movable relative to the slide and in the closed position the steering-spindle bearing unit is held by frictional resistance or by positive engagement so that it cannot move relative to the slide.

10. The steering system according to claim 6, further comprising retaining cheeks arranged on either side of the steering-spindle bearing unit, which are fastened to the housing and are in contact with side surfaces of the steering-spindle bearing unit, wherein the retaining cheeks have oblong holes, through which a clamping huh passes, and are connected with frictional resistance to the slide and the steering-spindle bearing unit.

* * * * *